July 2, 1957  E. M. GLADROW ET AL  2,798,050
PREPARATION OF ALUMINA GEL
Filed April 20, 1953.
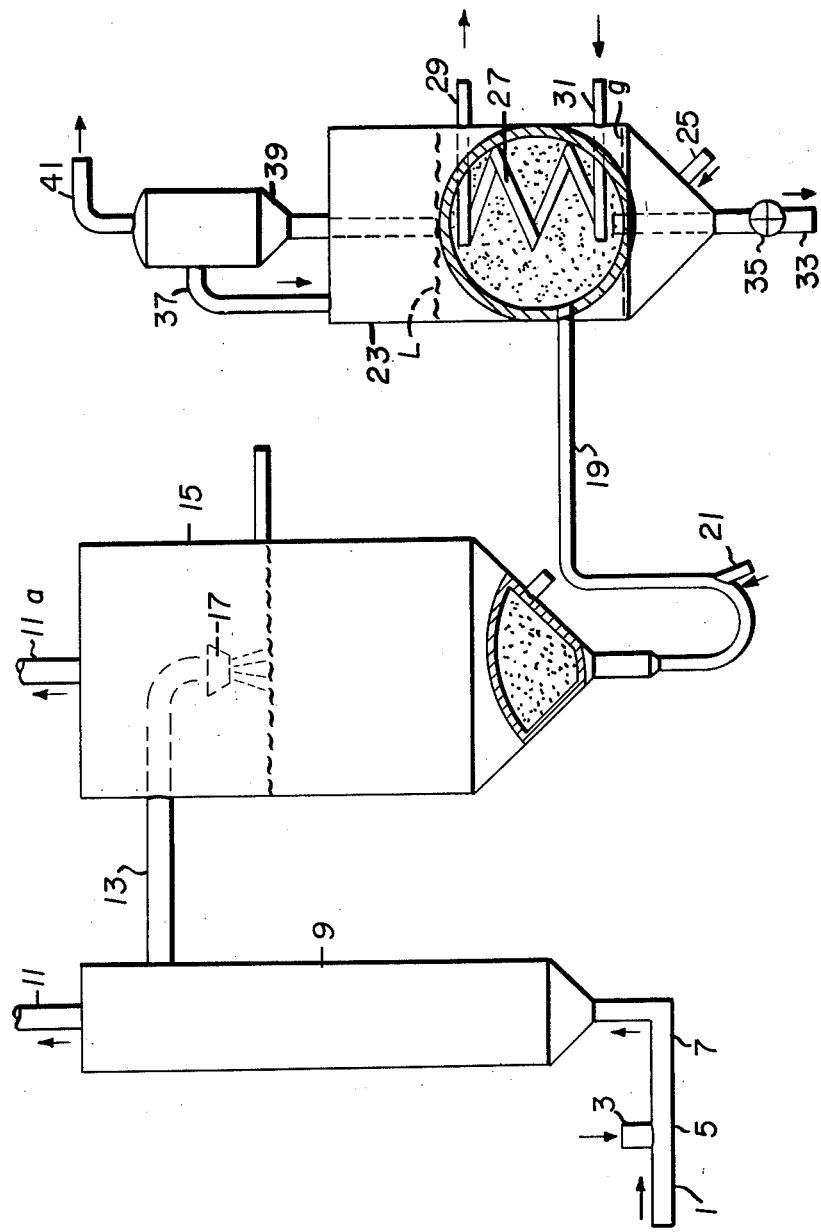
Elroy M. Gladrow
William F. Arey, Jr.   Inventors
By J. Cashman Attorney 2,798,050
PREPARATION OF ALUMINA GEL Elroy M. Gladrow and William F. Arey, Jr., Baton Rouge, La., assignors to Esso Research and Engineering Company, a corporation of Delaware Application April 20, 1953, Serial No. 349,802

9 Claims. (Cl. 252—466)

The present invention relates to a process for preparing alumina gels suitable for use as carriers or supports for catalysts. More particularly, the present invention relates to preparing an alumina gel of high density, high mechanical strength, high surface area, and high pore diameter.

It is a matter of record and commercial practice to prepare alumina gels from a starting material comprising an aluminum salt. It is also known in the art to prepare alumina gels by the so-called "aluminum alcoholate" method. The present invention relates to improvements in the preparation of gels by the alcoholate method and specifically relates to the method in which the hydrosol obtained from hydrolysis of aluminum alcoholate is converted to alumina hydrogel having improved properties.

It is the main object of the present invention to provide a process for preparing an alumina gel of high adsorptive capacity, high density and high attrition resistance when subjected to the influence of the severe conditions incident to its use in a dense fluidized bed.

It is a further object of the present invention to prepare a catalyst by incorporating in the alumina gel, prepared in accordance with the present invention, a hydrogenation catalyst such as a platinum group metal, a Six-Group metal oxide, and other active hydrogenation-dehydrogenation catalysts.

In the accompanying drawing there is shown diagrammatically a suitable apparatus in which the present invention may be carried into effect.

Although alumina gels can be prepared in several ways known in the art, the resultant gel requires a long time to set, and, at best, is a relatively soft gel. The present invention is a process for preparing an alumina gel of sufficient hardness and which requires a comparatively short time for gelation. This process involves the addition of several percent urea to an alumina hydrosol and then raising the temperature to effect hydrolysis of the urea. It is important that alumina hydrosol is employed, for aluminum salt solutions (nitrate, sulfate, chloride, etc.) yield a flocculent precipitate of the hydroxide when treated with urea.

The principle involved is believed to be that the conversion of the alumina hydrosol to alumina hydrogel occurs when the amount of free acid present in the hydrosol to stabilize the latter is reduced to below the minimum value. The use of urea, which is neutral in cool aqueous solutions, causes a constant increase in the pH of the aqueous medium as it undergoes decomposition according to the following reaction:

$$(NH_2)_2CO + 3H_2O \rightarrow 2NH_4OH + CO_2$$

The advantage which urea has over the use of other previous material such as ammonium hydroxide is that the action of the urea is homogeneous throughout the aqueous medium and the pH increase is uniformly steady. After the hydrolysis is completed, the resulting gel is clear and homogeneous.

A suitable alumina hydrosol for the process described in this invention may be prepared by the alcoholate method as follows. Fifty-four pounds of aluminum metal in the form of turnings is dissolved in about 124 gallons of a 50/50 mixture of mixed amyl alcohols and petroleum naphtha boiling in the range of about 200° to 300° F. About 1/10 ounce of mercuric chloride is used as a catalyst for the reaction between aluminum and the amyl alcohol. It is necessary to heat the mixture to start the reaction between the metal and the alcohol, but after the reaction is started, cooling is necessary. After the reaction is complete the solution of aluminum amylate is peptized by mixing with a solution of 4 gallons of acetic acid in about 396 gallons of water at a temperature of about 80° F. The peptized mixture is allowed to settle into an upper layer of regenerated amyl alcohol and petroleum naphtha and a lower layer of alumina sol. The latter is withdrawn and stripped of its small content of dissolved and entrained amyl alcohol and naphtha by blowing with steam. The resulting alumina hydrosol comprises about 3% alumina and about 1% by weight of acetic acid. The regenerated amyl alcohol and naphtha mixture is dried by distillation for re-use.

One way in which the present invention is carried out is indicated by reference to the accompanying drawing. Alumina hydrosol, prepared as described above, is introduced through line 1, where it is contacted with urea either in the form of solid or aqueous solution introduced via line 3 in mixing zone 5. The mixed solution from zone 5 is pumped via line 7 to a reactor 9 in an upflowing manner. Reactor 9 is a heated vessel serving to heat the mixed urea-alumina hydrosol solution to a temperature of about 180°–220° F. The flow rate of the urea-alumina hydrosol solution is adjusted so that the mixed solution is heated to 180°–220° F. and maintained in that temperature range for a period of from 1 to 20 minutes as the material is passed through reactor 9. The gaseous products are removed overhead through line 11. From reactor 9 the reactants pass through line 13 to a second vessel 15 where they are jetted by a suitable nozzle 17 into a body of hot oil contained in vessel 15. This oil is maintained at a temperature of about 180° to 300° F., preferably about 212° to 260° F. The expelled water vapor and other gases leave vessel 15 via line 11–A overhead. The particles of alumina hydrogel formed within the body of hot oil are microspherical in shape and collect at the bottom of vessel 15. These microspheres are withdrawn from vessel 15 through the bottom drawoff pipe 19. A suitable carrier gas is introduced through line 21 to transport the solids through line 19 to vessel 23 where they are formed into a dense fluidized bed extending from a grid or screen G to an upper dense phase level L. The gas for effecting the fluidization of the microspherical particles is introduced at the bottom of vessel 23 through line 25. This fluidizing gas may be air, steam or other inert stream. A heating coil 27 is disposed within the fluidized bed of microspheres undergoing treatment. Super-heated steam, or other heating fluid from some suitable source (not shown) is charged to coil 27 from line 29 and withdrawn from side coils in line 31. A temperature of 600°–1200° F. is maintained within the vessel 23, the purpose being, of course, to dry the gel to hard, adsorptive, high-surface area microspheres which may be recovered through drawoff pipe 33 controlled by valve 35. The fluidizing gas, the water, and the oil pass overhead from the fluidized mass of microspheres and are withdrawn from vessel 23 through line 37. In order to recover particles of gel entrained in the gasiform material issuing from vessel 23 the said gasiform material is forced through one or more "cyclones" 39, or through a filter or other means for removing and recovering such entrained material. The gas withdrawn from the "cyclone" 39 in line 41 is treated to recover any oil it contains using suitable equipment (not shown).

For purposes of illustration the following specific examples are presented to show the improved physical properties and catalytic performance of a catalyst based on alumina gel prepared by the process embodied in this invention.

Example I

About 200 gallons of the alumina hydrosol prepared as described above and containing about 3% by weight alumina and 1% acetic acid, the latter being a peptizing agent, was treated with a platinum sulfide hydrosol prepared in the following manner. About 10.3 ounces of platinum chloride (assaying 40% Pt) were dissolved in 34.8 gallons of water. In a separate vessel an ammonium polysulfide solution was prepared by mixing about 0.4 pint of commercial ammonium polysulfide solution (Merck's 20% Reagent Grade ammonium polysulfide) in about 12 gallons of water. The ammonium polysulfide solution was rapidly added to the platinum chloride solution with agitation to form the platinum sulfide hydrosol. The platinum sulfide hydrosol was admixed with the alumina hydrosol and placed in an oven to dry at about 260° F. This catalyst comprises about 0.5% Pt and 99.5% alumina.

A portion of this catalyst was activated at 1200° F. for 6 hours, after which time it had a surface area of about 219 square meters per gram, a pore volume of about 0.41 cc. per gram (as determined by nitrogen adsorption), and a Standard attrition rate of about 6.4% per hour.

The Standard attrition rate is a measure of the tendency of the particles of a fluidized catalyst to disintegrate into smaller particles in use. A low attrition rate is desirable for a catalyst for use in a fluidized system. The apparatus for measuring the Standard attrition rate comprises essentially a settling chamber consisting of a vertical cylinder with conical ends opening at the top into a dust collecting filter and having a 0.07 inch diameter jet mounted at the bottom for the introduction of air. The cylindrical section has a diameter of 9 inches and a length of 6¾ inches; the upper conical section has a length of 6¾ inches; the lower conical section has a length of 16¼ inches. A 15 gram sample of the fluidizable catalyst to be tested is placed in the apparatus and subjected to a jet of air using a flow rate of 21 liters of air per minute for 5 hours. The fines produced are collected in the dust collecting filter and weighed at hourly intervals. The Standard attrition rate is the average hourly rate of fines collection during hours 2 to 5 expressed as weight percent of the original catalyst charge.

A second portion of the oven dried catalyst prepared as described was pelleted in the form of $\frac{3}{16}$ inch by $\frac{3}{16}$ inch pellets and slowly heated to 900° F. over a period of 8 hours and held at 900° F. for 2 hours. This catalyst was ready for testing and is designated catalyst A.

Example II

About 200 gallons of the alumina hydrosol prepared as described above, containing about 3% alumina by weight and about 1% acetic acid by weight, the latter being a peptizing agent, was admixed with 40 pounds of urea at room temperature to dissolve the urea.

About 10.3 ounces of platinum chloride (assaying 40% Pt) were dissolved in 34.8 gallons of water. In a separate vessel an ammonium polysulfide solution was prepared by mixing about 0.4 pint of commercial ammonium polysulfide solution (Merck's 20% Reagent Grade ammonium polysulfide) in about 12 gallons of water. The ammonium polysulfide solution was rapidly added to the platinum chloride solution with agitation to form the platinum sulfide hydrosol.

The urea-alumina hydrosol-acetic acid mixture was heated to about 180° F., at which time the platinum sulfide hydrosol was added, using rapid agitation. Heat was continuously applied to bring the temperature to 195° F. and the mixture was maintained at that temperature for about 3 minutes. During this time the urea was undergoing hydrolysis to carbon dioxide and ammonia. The carbon dioxide was expelled to the atmosphere but the ammonia was consumed by reaction with the acetic acid present in the mixture. The net result was that the hydrosol became unstable and gelled, presumably due to neutralization of the acetic acid. The gelled mixture, containing the platinum sulfide in highly dispersed form, was dried in an oven at 260° F. This catalyst comprises about 0.5% Pt and 99.5% $Al_2O_3$.

A portion of this catalyst was activated at 1200° F. for 6 hours, after which time it had a surface area of about 230 square meters per gram, a pore volume of about 0.45 cc. per gram, and a Standard attrition rate of about 4.1% per hours.

A second portion of the oven dried catalyst prepared as described was pelleted in the form of $\frac{3}{16}$ inch x $\frac{3}{16}$ inch cylindrical pellets and slowly heated to 900° F. over a period of 8 hours and held at 900° F. for 2 hours. This catalyst was ready for testing and is designated catalyst B.

Example III

Catalysts "A" and "B" described in Examples I and II respectively were employed in the form of $\frac{3}{16}$ inch by $\frac{3}{16}$ inch cylindrical pellets in a fixed catalyst bed operation for the hydroforming of a 200° F. to 330° F. boiling range virgin naphtha from mixed Southeast and West Texas crudes. The conditions employed were 925° F. reactor temperature, 200 p. s. i. g. pressure, using 5000 cubic feet of hydrogen per barrel of naphtha feed, and a naphtha feed rate of approximately 2 weights of naphtha per weight of catalyst per hour; slight adjustments were made in the feed rate in order to obtain a $C_5^+$ product with each catalyst having a research octane number (clear) of 75.0. The yields of $C_5^+$ products are shown in the tabulation below:

| Catalyst | "A" | "B" |
|---|---|---|
| Research Octane No. (clear) | 75.0 | 75.0 |
| Yield of $C_5^+$ Product, Vol. percent | 90.3 | 91.3 |

It is an important feature of the present invention that in addition to the properties hereinbefore enumerated as possessed by the improved gel, namely, high density, hardness, and high-surface area, it may also, when dried by the hot oil technique described in the drawing, possess larger pore diameters than conventional alumina gel. This is important when the alumina is used as a carrier or a spacing agent, for a hydroforming catalyst, since these pores that have increased diameters tend to decrease cracking of the feed stock in a hydroforming operation. Such cracking is highly undesirable, since virgin naphthas are hydroformed primarily to increase their aromaticity. The data observed indicate that using an alumina base having larger pore diameters than the conventional alumina base, lowers the tendency of the naphthenes to undergo cracking under hydroforming conditions. This increased pore diameter of the present alumina gels is therefore an important attribute thereof.

To review briefly, the present invention relates to improvements in the preparation of alumina gels and is directed primarily to produce gels which possess the following characteristics: (1) good surface area, (2) high density, (3) large pore diameters, and (4) resistance to attrition when employed in powdered form in contact with a gasiform material as a dense fluidized bed. The starting material for preparing the gel is a metallic aluminum which is converted to an alcoholate. The preferred alcohol is one non-miscible with $H_2O$, e. g., n-butanol, amyl, etc. This alcoholate is then converted to a hydrosol which may be stabilized by a weak acid which serves to peptize the alumina in the aqueous medium. This hydrosol is then subjected to the influence of urea at elevated temperatures to convert the hydrosol into the corresponding hydrogel. The hydrogel is dried, preferably in hot oil, and eventually subjected to calcining temperatures according to known procedures or those described in the accompanying diagram to form a final product having the aforesaid characteristics and properties.

Several factors must be considered in carrying out the described process for producing the alumina hydrogel, which include the following.

1. The amount of urea employed is dependent on the free acid content of the hydrosal. At least a quantity of urea sufficient to neutralize the free acid should be used, preferably a 10% or more excess over the stoichiometric requirement is desired.

2. The hardness of the hydrogel is dependent on the length of time involved in effecting the gelation at temperatures above about 180° F. For example, when using a 3% hydrosal prepared as described above, hydrolysis is complete for solutions containing about 2 percent (based on weight of sol) urea in about 4–5 minutes at about 190° F.

3. The concentration of the hydrosol affects the gelation rate; the greater the alumina content in the hydrosol, the shorter the gelation time.

One important use of the alumina made according to the present invention is as a carrier spacing agent for hydroforming catalysts. A preferred form of such hydroforming catalysts is one containing a platinum group metal or a Six-Group metal oxide carried on the improved alumina gels made in accordance with the present invention. The catalyst thus prepared when ground to a powder of suitable particle size distribution may be utilized in hydroforming naphthas with good results where the catalyst is in the form of a dense fluidized bed. An alternative procedure to grinding the gel is to form the gel into microspheres according to the method hereinbefore set forth. Also, the gel may be formed into pills, pellets, or other shaped bodies and utilized as a catalyst in the hydroforming of naphthas where the catalyst is in the form of a fixed or stationary bed.

Numerous modifications of the present invention may be made by those who are familiar with the present art without departing from the spirit thereof.

What is claimed is:

1. A process for preparing an alumina gel of improved hardness, density and increased pore diameter which comprises reacting aluminum with an alcohol to form an alcoholate, adding water containing an acidic peptizing agent to thereby form a hydrosol, adding urea in sufficient amount to neutralize the acidic peptizing agent, causing the hydrosol to be converted to a hydrogel by the application of heat, drying the said gel and thereafter activating the dry gel by a heat treatment.

2. The method set forth in claim 1 in which the said alcohol is immiscible with water.

3. The method set forth in claim 1 in which the alcohol is amyl alcohol.

4. The method set forth in claim 1 in which the alumina hydrosol is formed in the presence of a catalytic agent.

5. The method set forth in claim 4 in which the catalytic agent is a platinum group metal.

6. The method set forth in claim 1 in which sufficient urea is added to neutralize the free acid in the hydrosol.

7. A process for preparing a platinum group metal catalyst supported on alumina gel which catalyst possesses improved hardness, density and increased pore diameter which comprises reacting aluminum with an alcohol to form an alcoholate, adding water containing an acidic peptizing agent to form a hydrosol, adding urea in sufficient amount to neutralize the acidic peptizing agent, procuring the said platinum group metal in the form of a hydrosol, mixing the hydrosols, causing the mixed hydrosols to be converted to a hydrogel during a relatively short period of time by the application of heat, drying the said hydrogel and activating the dry gel to form an active catalyst by heating at an elevated temperature.

8. The method set forth in claim 1 in which the hydrosol is sprayed into a hot oily medium, thereafter dried and activated to form the said gel into microspheres.

9. The method set forth in claim 7 in which the mixed sols are sprayed into a hot oily medium and thereafter dried and activated by a heat treatment to form a catalyst in the form of microspheres.

References Cited in the file of this patent

UNITED STATES PATENTS

| | | |
|---|---|---|
| 2,336,597 | Connolly | Dec. 14, 1943 |
| 2,471,000 | Messenger | May 24, 1949 |
| 2,636,865 | Kimberlin | Apr. 28, 1953 |